United States Patent
Nguyen et al.

(10) Patent No.: US 9,711,709 B2
(45) Date of Patent: Jul. 18, 2017

(54) TRANSDUCER SYSTEMS

(71) Applicant: General Electric Company, Schenectady, NY (US)

(72) Inventors: Toan H. Nguyen, Billerica, MA (US); Lei Sui, Billerica, MA (US); Nicholas Anderson Hobbs, Billerica, MA (US); Liguo Su, Billerica, MA (US)

(73) Assignee: General Electric Company, Schenectady, NY (US)

(*) Notice: Subject to any disclaimer, the term of this patent is extended or adjusted under 35 U.S.C. 154(b) by 744 days.

(21) Appl. No.: 13/961,935

(22) Filed: Aug. 8, 2013

(65) Prior Publication Data

US 2015/0042206 A1 Feb. 12, 2015

(51) Int. Cl.
*H01L 41/08* (2006.01)
*G01F 1/66* (2006.01)

(52) U.S. Cl.
CPC .............. *H01L 41/08* (2013.01); *G01F 1/662* (2013.01)

(58) Field of Classification Search
CPC .................................. H01L 41/08; G01F 1/662
USPC ..... 310/335, 336, 311, 338, 321.21; 73/644, 73/146.5, 861.18, 195, 196; 340/477
See application file for complete search history.

(56) References Cited

U.S. PATENT DOCUMENTS

| | | | | |
|---|---|---|---|---|
| 5,515,733 A | * | 5/1996 | Lynnworth | G01F 1/662 73/644 |
| 5,853,020 A | * | 12/1998 | Widner | B60C 23/004 137/227 |
| 8,904,881 B2 | * | 12/2014 | Sonnenberg | G01F 1/662 73/861.27 |
| 8,955,392 B2 | * | 2/2015 | Liu | G01F 1/66 73/861.28 |
| 2012/0125121 A1 | | 5/2012 | Gottlieb et al. | |

FOREIGN PATENT DOCUMENTS

| | | |
|---|---|---|
| DE | 4443415 A1 | 6/1996 |
| WO | 9618181 A1 | 6/1996 |
| WO | 0072000 A1 | 11/2000 |

OTHER PUBLICATIONS

European Search Report issued in connection with corresponding EP Application No. 14179586.4 on Dec. 12, 2014.

\* cited by examiner

*Primary Examiner* — Thomas Dougherty
*Assistant Examiner* — Karen B Addison
(74) *Attorney, Agent, or Firm* — Barclay Damon, LLP

(57) ABSTRACT

Transducer systems with reduced acoustic noise coupling are disclosed herein. In some embodiments, a transducer system includes pressure balancing features to prevent a floating portion of the transducer system from contacting a fixed portion of the transducer system, or to reduce the degree to which the floating portion is urged into contact with the fixed portion by process pressure or atmospheric pressure. In some embodiments, a transducer system includes one or more acoustic dampening elements, interruption grooves, annular projections, or dampening washers to reduce acoustic noise coupling between various components of the transducer system or between the transducer system and a flowcell in which the transducer system is mounted.

20 Claims, 5 Drawing Sheets

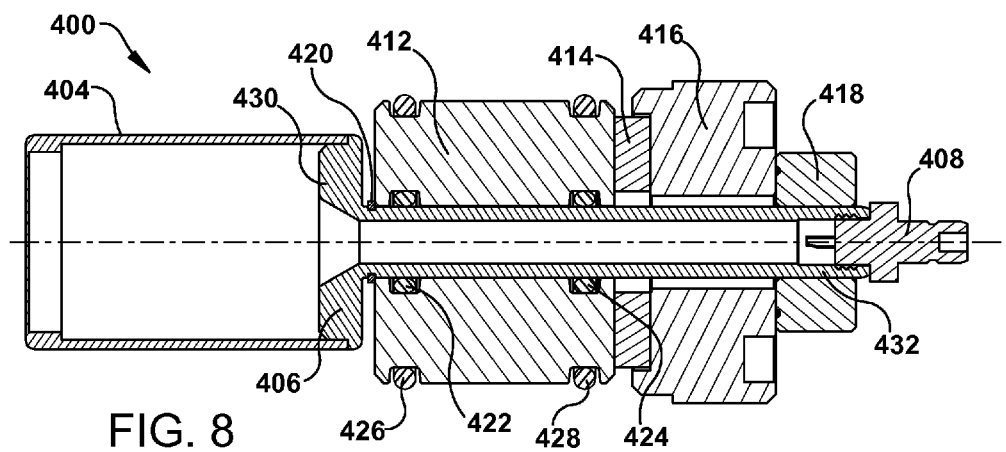
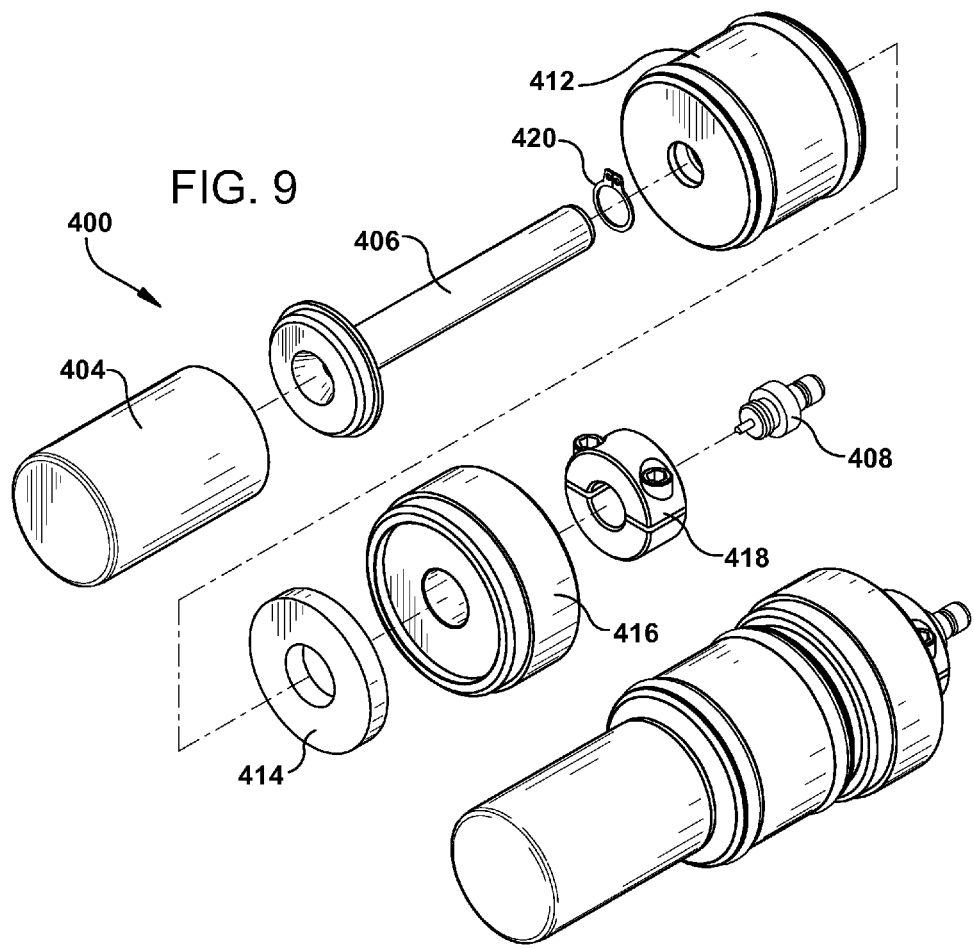

TRANSDUCER SYSTEMS

FIELD

The subject matter disclosed herein generally relates to transducer systems with reduced acoustic noise coupling.

BACKGROUND

The use of ultrasound to measure flow is well established with many installations worldwide in chemical plants, petrochemical plants, refineries, and so forth. A number of ultrasonic flowmeters have been developed, including transit-time based systems built as a one-piece "drop-in" flowcell with wetted transducers. In such systems, one or more transmitting transducers and one or more receiving transducers are aimed towards a medium flowing through the flowcell. An input voltage is applied to a transmitting transducer (transmitter) to cause it to transmit ultrasonic waves into the medium. These waves are received by a receiving transducer (receiver) and converted into an output voltage. The "time of flight" of the waves is determined by comparing the time at which the input voltage is applied to the time at which the output voltage is received.

The time required for an ultrasonic signal to travel against the flow (i.e., upstream), $t_{up}$, is longer than that required to travel with the flow (i.e., downstream), $t_{dn}$. The difference between upstream and downstream traveling times, $\Delta t$, is directly proportional to the flow velocity. The operation of an ultrasonic flowmeter strongly depends on the timing of $t_{up}$, $t_{dn}$, and $\Delta t$. The measurements of $t_{up}$, $t_{dn}$, and $\Delta t$ conversely rely on the quality of the received ultrasonic signal, e.g., the signal-to-noise ratio (SNR).

In general, it is more challenging to apply ultrasonic techniques to gas flow measurement than liquid for a variety of reasons, including the much lower acoustic impedance, higher Mach numbers, higher turn-down ratios, and larger pressure variations associated with gas flow measurement. For example, the conversion of an electrical pulse to an ultrasonic signal in a gas medium at 0 psig, via a piezoelectric crystal in a transducer, is very inefficient. As a result, the acoustic signal transmitting through the gas is very small and needs amplification. The amplification amplifies both the acoustic signal through the gas and the unwanted noise escaping from the side and back of the transmitting transducer through a solid path (e.g., the wall of the flowcell) to the side and back of the receiving transducer. In other words, acoustic noise emitted from the transmitting transducer is coupled to the flowcell and, ultimately, to the receiving transducer. This noise (sometimes referred to as "short circuit noise") generally does not carry any useful information about the fluid flow and thus contributes to the overall noise of the system and reduces the SNR. A high SNR is desired to make accurate and reliable flow measurements.

Accordingly, a need exists for transducer systems with reduced acoustic noise coupling.

BRIEF DESCRIPTION

Transducer systems with reduced acoustic noise coupling are disclosed herein. In some embodiments, a transducer system includes pressure balancing features to prevent a floating portion of the transducer system from contacting a fixed portion of the transducer system, or to reduce the degree to which the floating portion is urged into contact with the fixed portion by process pressure or atmospheric pressure. In some embodiments, a transducer system includes one or more acoustic dampening elements, interruption grooves, annular projections, or dampening washers to reduce acoustic noise coupling between various components of the transducer system or between the transducer system and a flowcell in which the transducer system is mounted.

In some embodiments, a transducer system includes a transducer head having an ultrasonic transducer disposed therein, a transducer stem extending from the transducer head, and a decoupling feature configured to reduce acoustic coupling between the transducer system and a housing when the transducer system is mounted in the housing.

In some embodiments, a transducer system includes a transducer head having an ultrasonic transducer disposed therein and having a first surface configured to be exposed to process pressure when the transducer system is mounted in a flowcell. The system also includes a transducer stem coupled to the transducer head and extending therefrom. The system also includes a pressure mounting assembly in which at least a portion of the transducer stem is disposed, the pressure mounting assembly having a first pressure balance surface configured to be exposed to process pressure when the transducer system is mounted in a flowcell. The first surface and the first pressure balance surface face in opposite directions such that process pressure acting on the first pressure balance surface offsets process pressure acting on the first surface.

In some embodiments, a transducer system includes a transducer head having an ultrasonic transducer disposed therein, a transducer stem extending from the transducer head, at least one acoustic dampening element disposed on an exterior of the transducer stem such that the at least one acoustic dampening element is disposed between the transducer stem and a flowcell when the transducer system is mounted in a flowcell, and an annular interruption groove formed in the transducer stem such that the interruption groove defines a longitudinal portion of the transducer stem having a reduced cross-sectional area.

In some embodiments, a transducer system includes a transducer head having an ultrasonic transducer disposed therein, a transducer stem extending from the transducer head, a piston disposed over the transducer stem, a first set of one or more acoustic dampening elements disposed between the piston and the transducer stem, a second set of one or more acoustic dampening elements disposed on an exterior of the piston such that the second set of acoustic dampening elements is disposed between the piston and a flowcell when the transducer system is mounted in a flowcell, a nut disposed over the transducer stem and configured to engage a bore of a flowcell, and a dampening washer disposed between the piston and the nut.

BRIEF DESCRIPTION OF THE DRAWINGS

These and other features will be more readily understood from the following detailed description taken in conjunction with the accompanying drawings, in which:

FIG. 8 is a sectional view of yet another embodiment of a transducer system; and FIG. 9 is a perspective exploded view and a perspective assembled view of the transducer system of FIG. 8.

Figure 1:
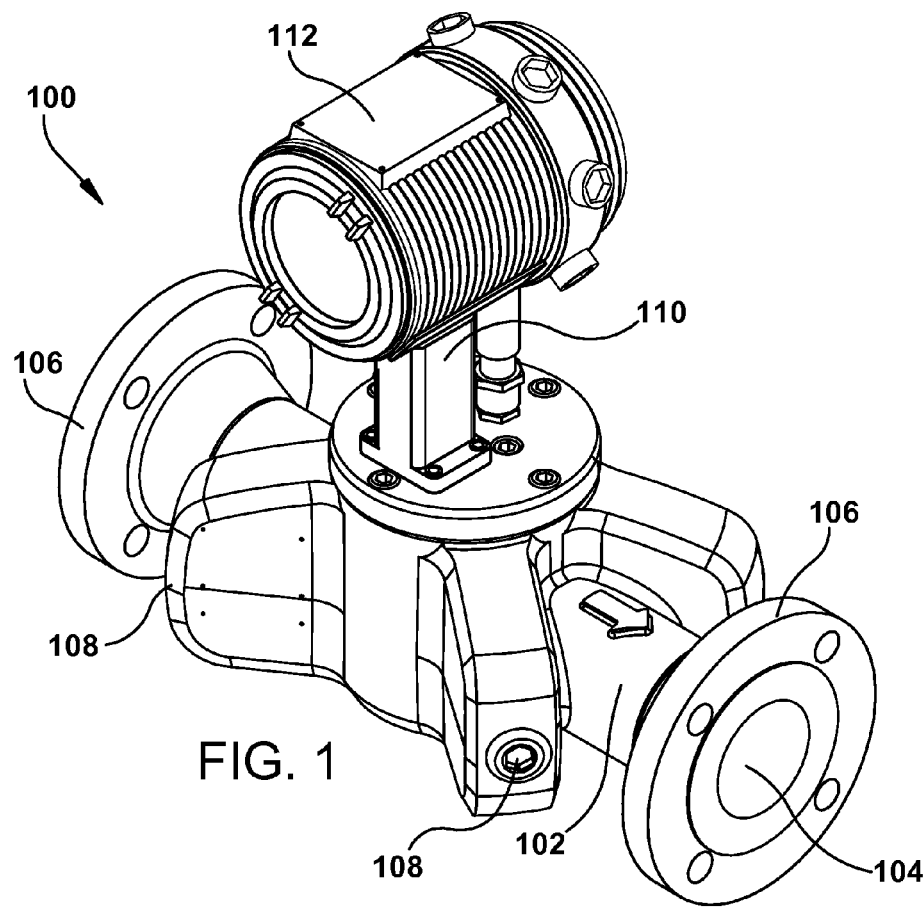
FIG. 1 is a perspective view of an exemplary flowcell in which transducer systems disclosed herein can be used.

It is noted that the drawings are not necessarily to scale. The drawings are intended to depict only typical aspects of the subject matter disclosed herein, and therefore should not be considered as limiting the scope of the disclosure. In the drawings, like numbering represents like elements between the drawings.

DETAILED DESCRIPTION

Certain exemplary embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Transducer systems with reduced acoustic noise coupling are disclosed herein. In some embodiments, a transducer system includes pressure balancing features to prevent a floating portion of the transducer system from contacting a fixed portion of the transducer system, or to reduce the degree to which the floating portion is urged into contact with the fixed portion by process pressure or atmospheric pressure. In some embodiments, a transducer system includes one or more acoustic dampening elements, interruption grooves, annular projections, or dampening washers to reduce acoustic noise coupling between various components of the transducer system or between the transducer system and a flowcell in which the transducer system is mounted.

Figure 2:
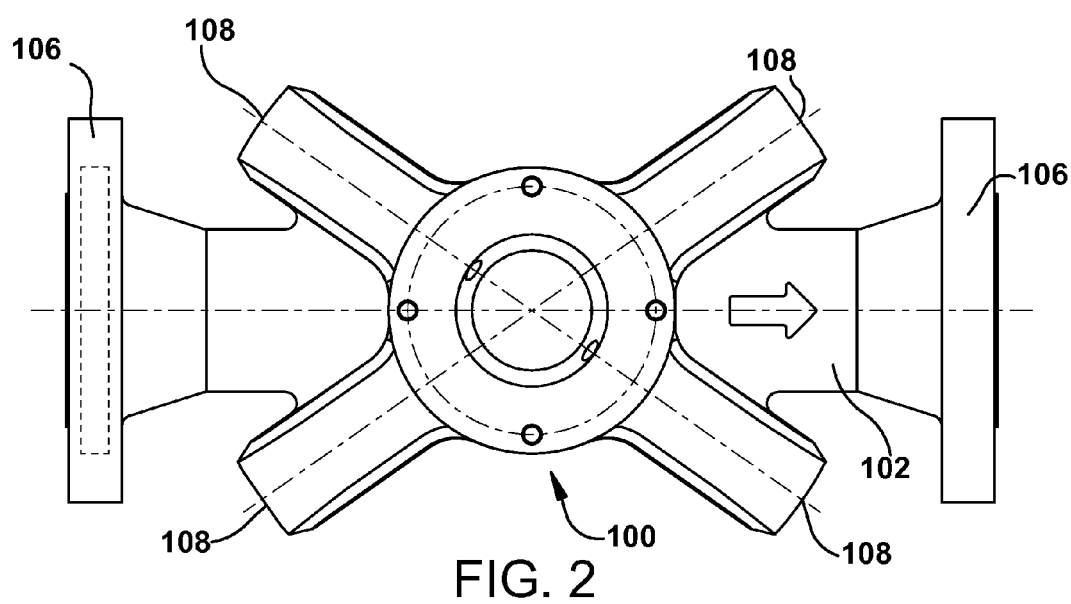
FIG. 2 is a plan view of the flowcell of FIG. 1.

FIGS. 1 and 2 illustrate one exemplary embodiment of a flowcell 100 in which the transducer systems disclosed herein can be used. As shown, the flowcell 100 includes a length of pipe 102 that defines a lumen 104 through which a medium flows. Flanges 106 are provided at either end of the flowcell 100 to facilitate installation of the flowcell in a larger flow system. The flowcell 100 also includes a plurality of bores or ports 108 in which transducer systems of the type described herein are installed. The ports 108 can be oriented at any of a variety of angles with respect to the flow path through the flowcell 100. In the illustrated embodiment, four transducer ports 108 are provided and each is oriented at an oblique angle with respect to the flow path through the flowcell 100. It will be appreciated that any number of pairs of transducer ports can be incorporated. The flowcell 100 also includes an electronics mount 110 and an electronics housing 112 in which circuits for controlling the transducers and calculating flow are disposed. Electrical conductors (not shown) couple the transducers to the circuits in the electronics housing 112.

In operation, a medium (e.g., gas, liquid, or multiphase) flows through the lumen 104 and the rate at which the medium is flowing is measured using a time of flight or other algorithm based on transmission and reception of ultrasonic waves by transducers mounted in the ports 108.

It will be appreciated that the illustrated flowcell 100 is merely exemplary, and that the transducer systems disclosed herein can be used with any of a variety of flowcells as well as in applications that do not include a flowcell. The transducer systems disclosed herein can be used with transit-time flowmeters, Doppler flowmeters, correlation flowmeters, Transflection flowmeters, wetted or non-wetted arrangements, portable or dedicated flowcells, and/or single or multiple channel flowcells. Applications in which the transducer systems disclosed herein can be used include water, waste water, process fluids, chemicals, hydrocarbons, oil, gas, custody transfer, topside or upstream multiphase, and so forth. Exemplary flowcells with which the transducers disclosed herein can be used include PANAFLOW, DIGITALFLOW, and SENTINEL flowmeters, available from GENERAL ELECTRIC COMPANY.

Figure 3:
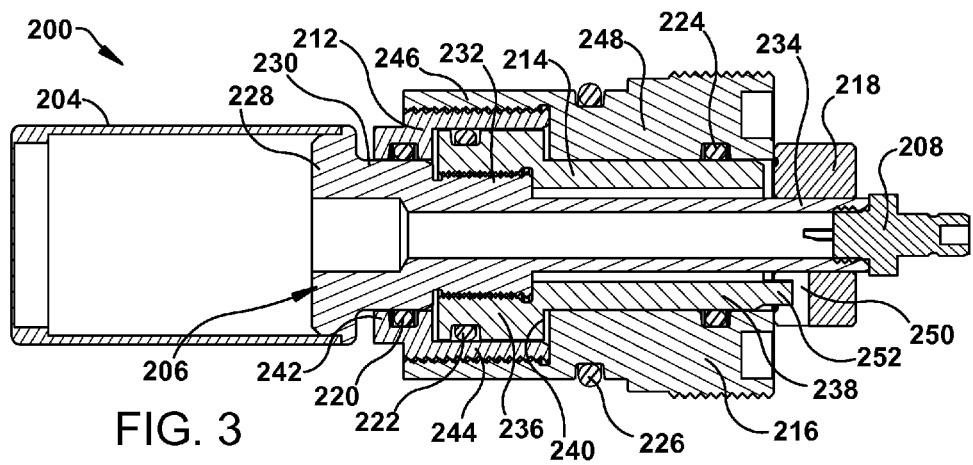
FIG. 3 is a sectional view of an exemplary embodiment of a transducer system.
Figure 4:
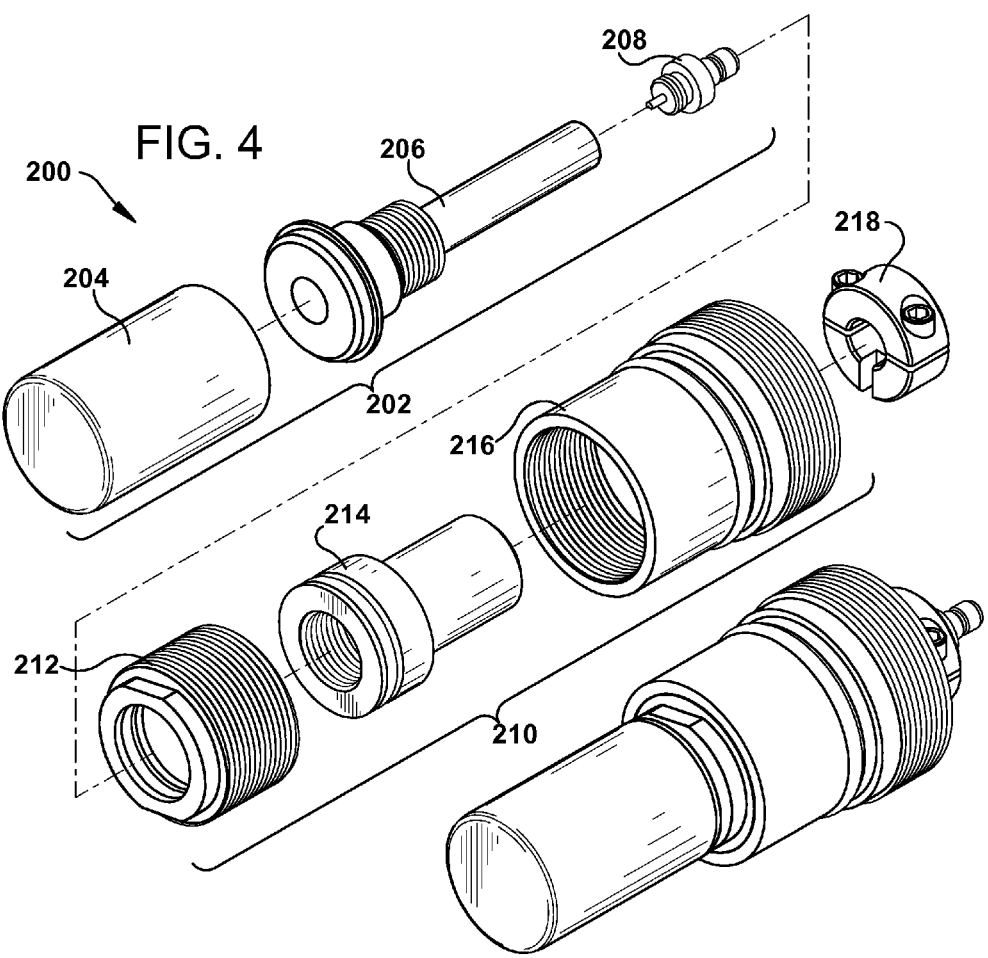
FIG. 4 is a perspective exploded view and perspective assembled view of the transducer system of FIG. 3.

FIGS. 3 and 4 illustrate an exemplary embodiment of a "floating" transducer system 200. In existing transducer systems, process pressure in the lumen of the flowcell urges the transducer system in a direction away from the process fluid into contact with the flowcell or transducer mounting hardware in which the transducer system is mounted. The higher the process pressure, the greater the acoustic coupling between the transducer system and the flowcell and the greater the short-circuit noise.

The floating transducer system 200 includes a floating portion that is prevented from contacting a fixed portion of the system, or at least that is urged into contact with the fixed portion by a lesser force than would otherwise be applied, thus reducing the acoustic coupling into the flowcell. In particular, the system 200 includes a path through which process pressure reaches a pressure balance surface on the "back" of the floating portion of the system. The geometry of this pressure balance surface is selected such that the force applied to the "front" of the floating portion by the process pressure is substantially equal to the force applied to the "back" of the floating portion by the process pressure. A separation gap is maintained between the floating portion of the system 200 and the fixed portion of the system, or at least the force with which the floating portion is urged into contact with the fixed portion is reduced. A similar arrangement is provided to balance the forces applied to the floating portion by atmospheric pressure.

As the process pressure increases or decreases, the forces applied to the "front" and "back" of the floating portion likewise increase or decrease, such that the noise coupling between the floating portion and the fixed portion remains substantially the same, regardless of the process pressure. As a result, the noise amplitude will likewise be substantially constant, regardless of process pressure.

As shown in FIGS. 3 and 4, the floating transducer system 200 includes a transducer assembly 202 having a transducer head 204, a transducer stem 206, and a transducer connector 208. The system 200 also includes a pressure mounting assembly 210 having a seal plug 212, a piston 214, and an exterior sleeve 216. A clamp 218 is also included to help retain the transducer assembly 202 within the pressure mounting assembly 210. The system 200 also includes one or more o-rings or gaskets 220, 222, 224, 226 in respective grooves of various components of the system for providing a seal between said components and other components of the system, and for further reducing acoustic coupling.

The transducer head 204 houses an ultrasonic transducer, such as a piezoelectric crystal or ceramic, configured to produce ultrasonic mechanical waves in response to applied electrical power. In the illustrated embodiment, the transducer head 204 is a hollow cylindrical canister, in which the ultrasonic transducer is mounted. While ultrasonic piezoelectric elements are generally described herein, any of the transducer systems disclosed herein can use other types of transducers (e.g., non-ultrasonic transducers, magnetostrictive transducers, capacitive transducers, and so forth).

The transducer stem 206 includes a first portion 228 to which the transducer head 204 is coupled using any suitable joining mechanism, such as a welded connection, a press-fit connection, or a threaded connection. The transducer stem 206 also includes a first stepped-down portion 230 that defines a sealing surface against which a first o-ring 220 forms a seal between the transducer stem and the seal plug 212, as discussed in further detail below. The transducer stem 206 also includes a second stepped-down portion 232 that defines an external threaded surface for engaging a counterpart internal threaded surface of the piston 214. The transducer stem 206 also includes a second portion 234, which is of sufficient length to extend entirely through the exterior sleeve 216. The second portion 234 includes an internal threaded surface for engaging a counterpart external threaded surface of the transducer connector 208. The transducer stem 206 defines a central lumen through which electrical leads extend from the ultrasonic transducer in the transducer head 204 to the transducer connector 208.

The transducer connector 208 substantially closes the second end of the transducer stem 206 (e.g., via a threaded connection or other suitable joining mechanism as described above), and is configured to provide an electrical connection between the internal electronics of the transducer system 200 (e.g., a piezoelectric element and associated conductors) and external conductors for electrically coupling the transducer system to the electronics housing of the flowcell.

The piston 214 is coupled to the transducer stem 206 such that the longitudinal position of the piston with respect to the transducer stem is fixed. In the illustrated embodiment, the piston 214 includes a first portion 236 having a bore formed therein configured to receive the second stepped-down portion 232 of the transducer stem 206 in a threaded engagement. The first portion 236 also includes a channel formed in an exterior surface thereof for receiving at least a portion of a second o-ring 222. The second o-ring 222 is configured to form a seal between the first portion 236 of the piston 214 and the seal plug 212. The piston 214 also includes a second portion 238 that defines a central lumen through which the second portion 234 of the transducer stem 206 is received. An exterior surface of the second portion 238 defines a sealing surface against which a third o-ring 224 forms a seal between the piston 214 and the exterior sleeve 216, as discussed in further detail below. The diameter of the second portion 238 of the piston 214 is less than that of the first portion 236, such that a shoulder is formed at the junction between the first and second portions, the shoulder defining a surface 240 that faces in a direction away from the process fluid.

The seal plug 212 includes a first portion 242 having a bore formed therein configured to receive the first stepped-down portion 230 of the transducer stem 206. The first portion 242 also includes a channel formed in an interior surface thereof for receiving at least a portion of the first o-ring 220, such that the first o-ring forms a seal between the transducer stem 206 and the seal plug 212. The seal plug 212 also includes a second portion 244 that defines a bore in which the first portion 236 of the piston 214 is received. The second o-ring 222 forms a seal between the first portion 236 of the piston 214 and the interior of the bore. An exterior surface of the second portion 244 defines a threaded surface configured to engage a counterpart internally-threaded bore formed in a first portion 246 of the exterior sleeve 216.

The exterior sleeve 216 also includes a second portion 248 that defines a central lumen in which the second portion 238 of the piston 214 is received. A channel is formed in an interior surface thereof for receiving at least a portion of a third o-ring 224. The third o-ring 224 is configured to form a seal between the second portion 238 of the piston 214 and the exterior sleeve 216. The exterior sleeve 216 also includes a channel formed in an exterior surface thereof for receiving at least a portion of a fourth o-ring 226. The fourth o-ring 226 is configured to form a seal between the exterior sleeve 216 and a flowcell in which the system 200 is mounted (e.g., one of the transducer ports of the flowcell). The exterior sleeve 216 also includes an external threaded surface for engaging a counterpart threaded portion of the flowcell port.

The clamp 218 includes first and second hemi-cylindrical portions configured to fit around the transducer stem 206. The clamp 218 also includes one or more adjustment screws which can be tightened or loosened to engage or disengage the clamp from the transducer stem 206. The clamp 218 also includes a recess 250 in which a longitudinally-extending tab portion 252 of the piston 214 is received to prevent the piston from rotating relative to the transducer stem 206 when the clamp is engaged.

It will be appreciated that the transducer system 200 includes a floating portion (e.g., the transducer head 204, the transducer stem 206, and the piston 214) and a fixed portion (e.g., the seal plug 212 and the exterior sleeve 216).

Figure 5:
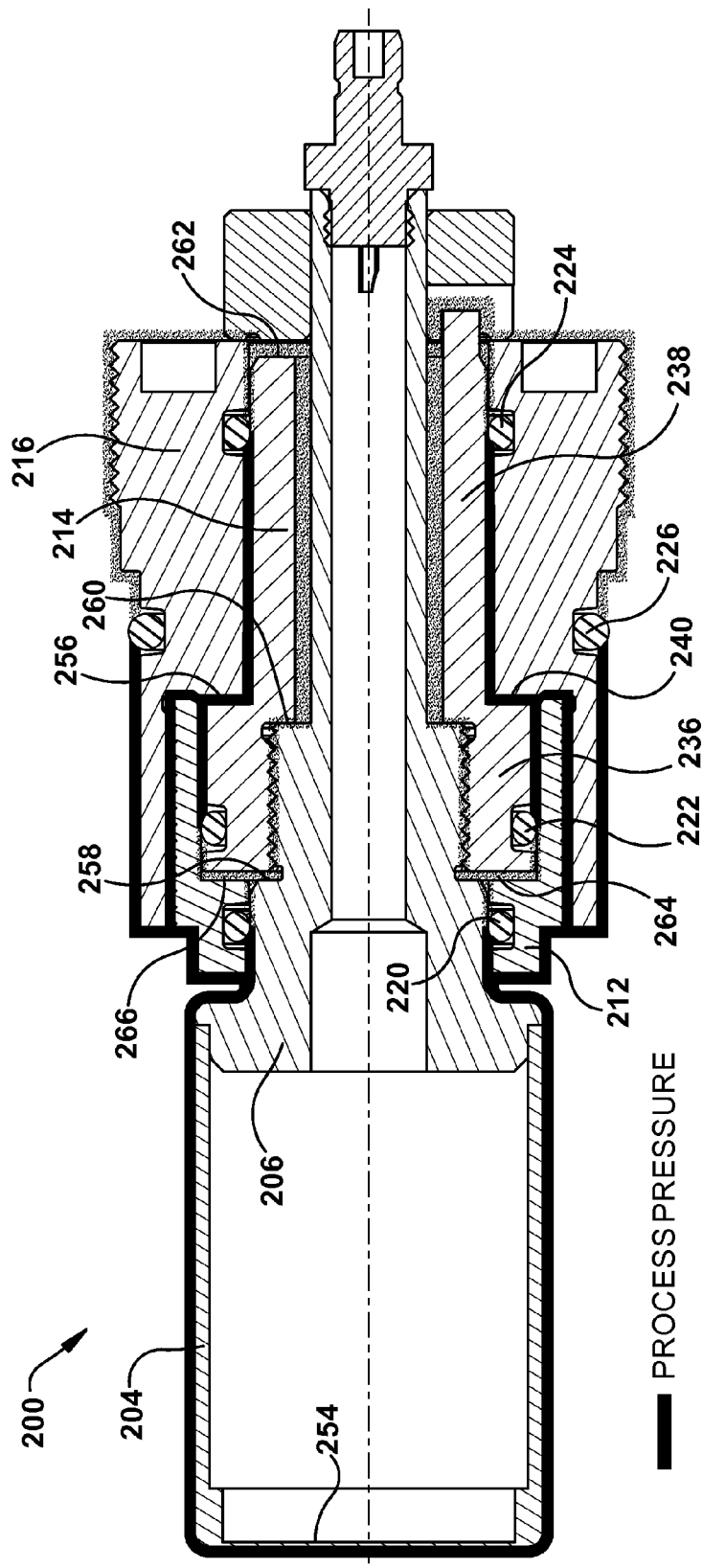
FIG. 5 is a sectional view of the transducer system of FIG. 3 with hatching to indicate pressure exposure.

As shown in FIG. 5, process pressure acts upon several surfaces of the floating portion of the system 200. (The surfaces on which process pressure acts are denoted using hatching of a first type, as noted in the legend of FIG. 5). Notably, process pressure acting on the surface 254 of the transducer head 204 that faces in the direction of the process fluid would ordinarily tend to urge the floating portion into firm contact with the fixed portion and, by extension, the surrounding flowcell, providing an acoustical coupling through which noise easily propagates. However, because the threaded interface between the seal plug 212 and the exterior sleeve 216 is not well-sealed, process pressure extends through the threaded interface and acts on a pressure balance surface 240 that faces in a direction away from the process fluid. The pressure balance surface 240 is defined by the shoulder or step-down where the first portion 236 of the piston 214 meets the second portion 238 of the piston. Process pressure is contained in the vicinity of the pressure balance surface 240 by the second and third o-rings 222, 224. The fourth o-ring 226 prevents the process pressure from escaping around the exterior surface of the exterior sleeve 216, and provides additional acoustic noise dampening between the sleeve and the flowcell.

The geometry of the pressure-balance surface 240 is selected to balance the forces applied by the process pressure towards and away from the process fluid, so as to maintain a gap 256 between the floating portion of the system 200 and the fixed portion of the system, or at the very least to reduce the force with which the floating portion is urged into contact with the fixed portion. For example, the surface area of the pressure-balance surface 240 can be selected such that the aggregate surface area of all surfaces facing towards the process fluid of the floating portion that are exposed to process pressure is substantially or approximately equal to the aggregate surface area of all surfaces facing away from the process fluid of the floating portion that are exposed to process pressure. By substantially or approximately equal, it is meant that the respective surface areas are close enough to one another to be functionally equivalent, as would be readily understood by a person of ordinary skill in the art, subject to manufacturing tolerances, thermal expansion and contraction, and so forth.

As also shown in FIG. 5, atmospheric pressure acts upon several surfaces of the floating portion of the system 200. (The surfaces on which atmospheric pressure acts are denoted using hatching of a second type, as noted in the legend of FIG. 5). Notably, atmospheric pressure acting on the shoulder 258 defined at the transition between the first and second stepped-down portions of the transducer stem, the shoulder 260 defined at the transition between the second stepped-down portion and the second portion of the transducer stem, and the surface 262 of the piston 214 that faces in a direction away from the process fluid, would ordinarily tend to urge the floating portion in a direction towards the process fluid into firm contact with the surrounding fixed portion. However, because the threaded interface between the transducer stem 206 and the piston 214 is not well-sealed, atmospheric pressure extends through the threaded interface and acts on a pressure balance surface 264 that faces in a direction towards the process fluid. The pressure balance surface 264 is defined by the terminal first end of the piston 214. Atmospheric pressure is contained in the vicinity of the pressure balance surface 264 by the first and second o-rings 220, 222.

The geometry of the pressure-balance surface 264 is selected to balance the forces applied by the atmospheric pressure towards and away from the process fluid, so as to maintain a gap 266 between the floating portion of the system 200 and the fixed portion, or at the very least to reduce the force with which the floating portion is urged into contact with the fixed portion. For example, the surface area of the pressure-balance surface 264 can be selected such that the aggregate surface area of all surfaces facing towards the process fluid of the floating portion that are exposed to atmospheric pressure is substantially or approximately equal to the aggregate surface area of all surfaces facing away from the process fluid of the floating portion that are exposed to atmospheric pressure. By substantially or approximately equal, it is meant that the respective surface areas are close enough to one another to be functionally equivalent, as would be readily understood by a person of ordinary skill in the art, subject to manufacturing tolerances, thermal expansion and contraction, and so forth.

In sum, the system 200 includes pressure balance surfaces 240, 264 facing towards and away from the process fluid which are configured to balance or at least partially offset the forces applied by process pressure and atmospheric pressure, respectively, such that a gap 256, 266 is maintained between the floating portion and the fixed portion, or at least such that the force with which the floating portion is urged into contact with the fixed portion is reduced. This is effective to reduce propagation of noise from the transducer into the surrounding flowcell and, ultimately, to the receiver transducer.

Figure 6:
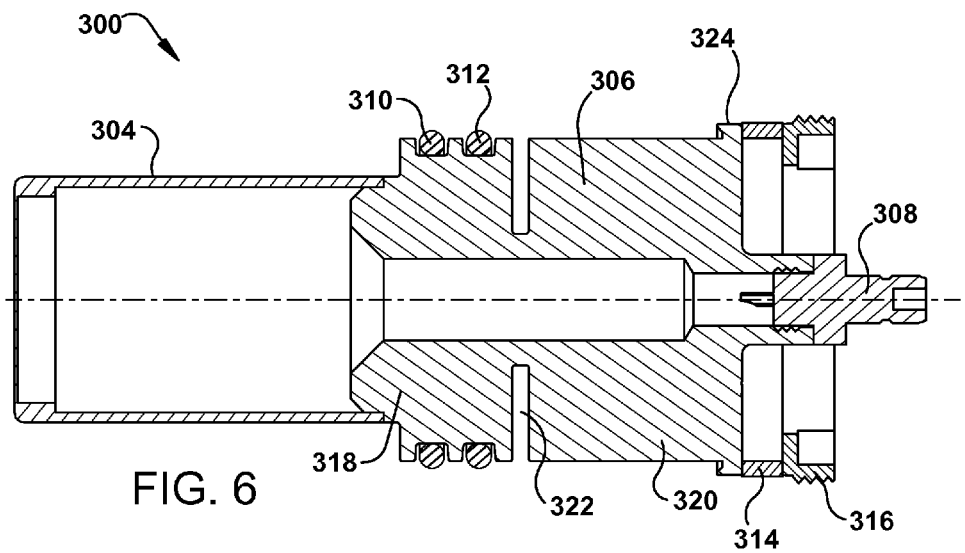
FIG. 6 is a sectional view of another embodiment of a transducer system.
Figure 7:
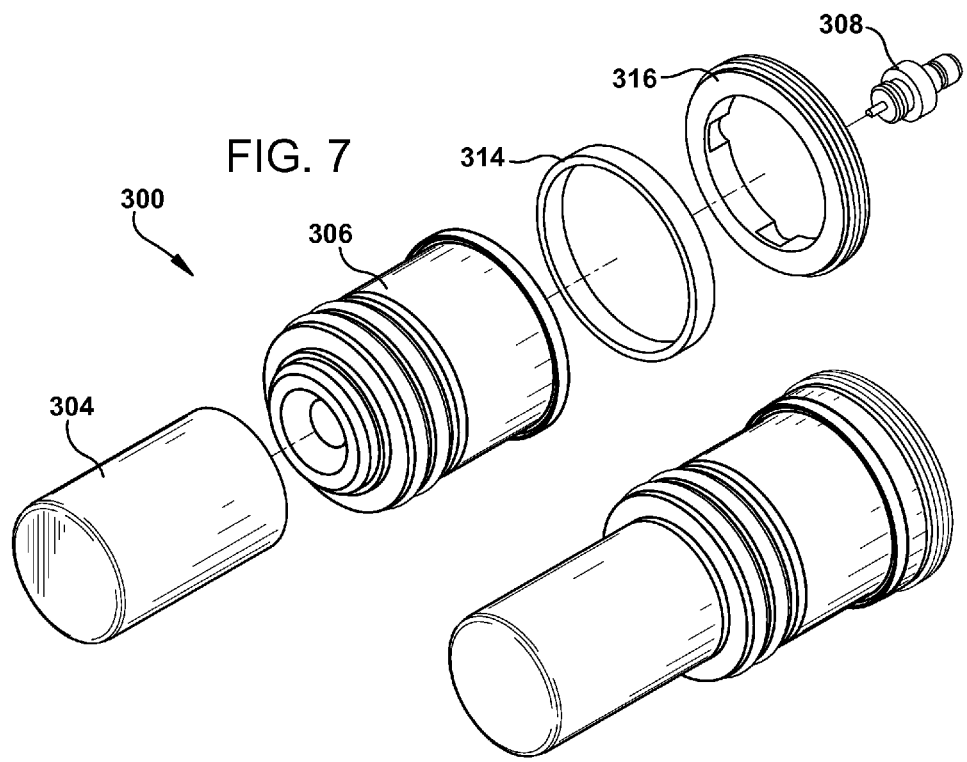
FIG. 7 is a perspective exploded view and perspective assembled view of the transducer system of FIG. 6.

FIGS. 6 and 7 illustrate an exemplary embodiment of a "rigid" transducer system 300. In existing transducer systems, a significant portion of the transducer system is in direct metal-to-metal contact with the transducer bore of the flowcell, which undesirably provides strong acoustic noise coupling. The rigid transducer system 300, on the other hand, includes one or more acoustic dampening elements configured to limit the coupling of noise between the transducer system and the flowcell. The system 300 also includes one or more interruption grooves or channels to limit the cross-sectional area through which ultrasound waves propagate through the back or sides of the transducer. The system 300 also includes an annular projection configured to act as a standoff between the transducer system and the flowcell. The length of the projection is significantly less than the overall length of the transducer system, such that the contact surface area between the projection and the flowcell is significantly less than the overall surface area of the flowcell bore.

As shown in FIGS. 6 and 7, the rigid transducer system 300 includes a transducer assembly having a transducer head 304, a transducer stem 306, and a transducer connector 308. The system 300 also includes one or more acoustic dampening elements 310, 312 for reducing acoustic noise coupling, a dampening washer 314, and a retaining nut 316.

The transducer head 304 houses an ultrasonic transducer, such as a piezoelectric crystal or ceramic, configured to produce ultrasonic mechanical waves in response to an applied voltage. In the illustrated embodiment, the transducer head 304 is a hollow cylindrical canister, in which the ultrasonic transducer is mounted. While ultrasonic piezoelectric elements are generally described herein, any of the transducer systems disclosed herein can use other types of transducers (e.g., non-ultrasonic transducers, magnetostrictive transducers, capacitive transducers, and so forth).

The transducer stem 306 includes a first portion 318 to which the transducer head 304 is coupled using any suitable joining mechanism, such as a welded connection, a press-fit connection, or a threaded connection. The first portion 318 also includes first and second grooves or channels formed therein in which respective acoustic dampening elements (e.g., o-rings) 310, 312 are disposed. When assembled, the o-rings 310, 312 are disposed between the transducer stem 306 and the surrounding flowcell bore, isolating the transducer stem from metal-on-metal contact and reducing acoustic noise coupling. While less than two o-rings can be used (e.g., one o-ring), the use of two or more o-rings advantageously provides additional support for the transducer stem 306 to prevent it from rocking within the flowcell bore. While the o-ring channels are shown and described as being in the first portion 318 of the transducer stem 306, it will be appreciated that one or more o-ring channels can be formed in a second portion 320 of the transducer stem, with or without additional o-ring channels formed in the first portion.

The transducer stem 306 also includes an annular interruption groove or channel 322. The interruption groove 322 reduces the cross-sectional surface area along a longitudinal portion of the transducer stem 306, reducing the area through which acoustic noise propagates through the rigid structure of the transducer stem. Since acoustic noise is not easily coupled through the air gap provided by the channel 322, such an arrangement produces less noise coupling than one in which the channel is absent and the transducer stem 306 is simply a solid unbroken wall. Additionally, the varying metal thickness causes a shift in acoustic propagation properties (e.g., speed of sound, acoustic impedance, etc.) which will tend to reject acoustic energy from propagating therethrough.

The interruption groove 322 can penetrate to any of a variety of depths through the wall of the transducer stem 306 (e.g., at least about 10%, at least about 25%, at least about 50%, at least about 75%, and/or at least about 90%). In some embodiments, the interruption groove 322 penetrates to the greatest extent possible while still maintaining the structural integrity of the transducer stem 306 given the intended application (e.g., the process pressure, flowcell lumen diameter, etc.). While a single interruption groove 322 is shown and described herein, it will be appreciated that more than one interruption groove can be included.

The transducer stem 306 also includes an annular projection or region of increased circumference 324 configured to act as a standoff between the flowcell bore and the remainder of the transducer stem 306. The projection 324 can be a continuous ring-shaped projection, or can be a plurality of discrete standoff sections spaced about the circumference of the transducer stem 306. The length of the annular projection 324 is selected to be significantly less than the overall length of the transducer stem 306 (e.g., less than about 50%, less than about 20%, less than about 10%, and/or less than about 5% percent). By making the projection 324 relatively short in length relative to the length of the transducer stem 306, the contact surface area between the transducer stem and the flowcell port is significantly reduced as compared with a variation in which the projection is omitted and a majority of the exterior surface of the stem is in direct contact with the flowcell bore. With less contact surface area, less acoustic noise coupling occurs between the system 300 and the flowcell.

The transducer stem 306 also includes an internally-threaded bore configured to mate with counterpart threads formed on the exterior of the transducer connector 308. The transducer stem 306 defines a central lumen through which electrical leads extend from the ultrasonic transducer in the transducer head 304 to the transducer connector 308.

The transducer connector 308 substantially closes the second end of the transducer stem 306 (e.g., via a threaded connection as described above), and is configured to provide an electrical connection between the internal electronics of the transducer system 300 (e.g., a piezoelectric element and associated conductors) and external conductors for electrically coupling the transducer system 300 to the electronics housing of the flowcell.

The system 300 also includes a retaining nut 316 disposed over the transducer stem 306 without contacting the transducer stem. The retaining nut 316 includes an exterior threaded surface configured to engage a corresponding threaded surface of the flowcell port, and is configured to prevent the transducer system 300 from moving out of the flowcell port in a direction away from the process fluid. A dampening washer 314 is disposed over the transducer stem 306 and positioned between the annular projection 324 and the retaining nut 316. The dampening washer 314 is formed from an acoustically-dampening material, as described below, to reduce the acoustic noise coupling between the transducer stem 306 and the retaining nut 316 and, ultimately, the flowcell and the receiver transducer.

In operation, process pressure in the flow path of the flowcell would otherwise urge the transducer system 300 in a direction away from the process fluid into firm contact with the nut 316 and, by extension, the surrounding flowcell, undesirably coupling acoustic noise into the flowcell. The dampening washer 314, however, is disposed between the stem 306 and the nut 316 and forms an acoustic break, reducing the degree to which noise is coupled from the stem to the nut and the flowcell.

FIGS. 8 and 9 illustrate an exemplary embodiment of a "floating sleeve" transducer system 400. The floating sleeve transducer system 400 includes a piston sleeve disposed around the transducer stem and o-rings configured to dampen acoustic coupling between the stem and the sleeve and between the sleeve and the flowcell. In addition, an acoustic dampening washer or other element is disposed between the sleeve and a nut in the direction of the process pressure.

As shown, the system 400 includes a transducer assembly having a transducer head 404, a transducer stem 406, and a transducer connector 408. The system 400 also includes a sleeve assembly having a piston 412, a dampening washer 414, and a retaining nut 416. A clamp 418 and a retaining ring 420 are also included to help retain the transducer assembly within the sleeve assembly. The system 400 also includes one or more o-rings or gaskets 422, 424, 426, 428 for providing a seal between various components of the system and for further reducing acoustic noise coupling.

The transducer head 404 houses an ultrasonic transducer, such as a piezoelectric crystal or ceramic, configured to produce ultrasonic mechanical waves in response to an applied voltage. In the illustrated embodiment, the transducer head 404 is a hollow cylindrical canister, in which the ultrasonic transducer is mounted. While ultrasonic piezoelectric elements are generally described herein, any of the transducer systems disclosed herein can use other types of transducers (e.g., non-ultrasonic transducers, magnetostrictive transducers, capacitive transducers, and so forth).

The transducer stem 406 includes a first portion 430 to which the transducer head 404 is coupled using any suitable joining mechanism, such as a welded connection, a press-fit connection, or a threaded connection. The transducer stem 406 also includes a stepped-down second portion 432 that defines a sealing surface against which first and second o-rings 422, 424 form a seal between the transducer stem and the piston 412, as discussed in further detail below. The second portion 432 is of sufficient length to extend entirely through the sleeve assembly. The second portion 432 includes an internal threaded surface for engaging a counterpart external threaded surface of the transducer connector 408. The transducer stem 406 defines a central lumen through which electrical leads extend from the ultrasonic transducer in the transducer head 404 to the transducer connector 408.

The transducer connector 408 substantially closes the second end of the transducer stem 406 (e.g., via a threaded connection as described above), and is configured to provide an electrical connection between the internal electronics of the transducer system 400 (e.g., a piezoelectric element and associated conductors) and external conductors for electrically coupling the transducer system to the electronics housing of the flowcell.

The piston 412 is a tubular member disposed over the transducer stem 406 such that the second portion 432 of the stem extends through a central lumen of the piston. First and second acoustic dampening elements such as the first and second o-rings 422, 424 are positioned in grooves or channels formed in the interior surface of the piston and/or the exterior surface of the transducer stem 406 to form a seal between the piston and the transducer stem and to reduce acoustic noise coupling between said components. The piston 412 also includes grooves or channels formed in the exterior surface thereof in which acoustic dampening elements such as the third and fourth o-rings 426, 428 are positioned to form a seal between the piston and the flowcell and to reduce acoustic noise coupling between said components. While two acoustic dampening elements 422, 424 are shown between the piston 412 and the stem 406, it will be appreciated that more or less than two dampening elements can be included. In addition, while two acoustic dampening elements 426, 428 are shown between the piston 412 and the flowcell, it will be appreciated that more or less than two dampening elements can be included.

The system 400 also includes a retaining nut 416 disposed over the transducer stem 406 without contacting the transducer stem. The retaining nut 416 includes an exterior threaded surface configured to engage a corresponding threaded surface of the flowcell port, and is configured to prevent the transducer system 400 from moving out of the flowcell port in a direction away from the process fluid. A dampening washer 414 is disposed over the transducer stem 406 and positioned between the piston 412 and the retaining nut 416. The dampening washer 414 is formed from an acoustically-dampening material, as described below, to reduce the acoustic noise coupling between the piston 412 and the retaining nut 416 and, ultimately, the flowcell and the receiver transducer.

In operation, process pressure in the flow path of the flowcell would otherwise urge the transducer system 400 in a direction away from the process fluid into firm contact with the nut 416 and, by extension, the surrounding flowcell, undesirably coupling acoustic noise into the flowcell. The dampening washer 414, however, is disposed between the piston 412 and the nut 416 and forms an acoustic break, reducing the degree to which noise is coupled from the piston to the nut and the flowcell.

The clamp 418 includes first and second hemi-cylindrical portions configured to fit around the transducer stem 406, and is configured to prevent the piston 412 from moving relative to the stem in a direction away from the process fluid. The clamp 418 also includes one or more adjustment screws which can be tightened or loosened to engage or disengage the clamp from the transducer stem 406. The retaining ring 420 is a spring clip configured to fit around the transducer stem 406 and engage a groove formed in the exterior of the transducer stem. The retaining ring 420 thus prevents the piston 412 from moving relative to the stem 406 in a direction towards the process fluid.

In operation, the first and second o-rings 422, 424 reduce the amount of acoustic noise coupled from the transducer stem 406 to the piston 412. Propagation of any noise that does couple to the piston 412 is impeded from coupling to the flowcell by the third and fourth o-rings 426, 428. Furthermore, as process pressure tends to urge the transducer system 400 in a direction away from the process fluid, the washer 414 dampens the transmission of acoustic noise from the piston 412 to the nut 416 and, ultimately, to the surrounding flowcell.

The components of the transducer systems disclosed herein can be formed from any of a variety of materials including, without limitation, metals such as stainless steel, titanium, aluminum, iron, and/or combinations thereof. The acoustic dampening elements and the dampening washers disclosed herein can be formed of acoustically-dampening materials including, without limitation, graphite, elastomers (e.g., neoprene), fluoroelastomers, polytetrafluoroethylene (PTFE), and/or combinations thereof.

The features disclosed herein with respect to any particular embodiment can be combined with or incorporated into any other embodiment.

The transducer systems disclosed herein produce a number of advantages and/or technical effects. For example, in some embodiments, acoustic noise coupling between the transducer and the flowcell is decreased, improving the SNR of the flowmeter and providing more accurate flow measurements.

Although the transducer systems disclosed herein are generally described in the context of a flowmeter, it will be appreciated that they have application in various other contexts. For example, the transducer systems disclosed herein can be used in any system in which it is desirable to reduce the acoustic noise coupling between a transducer and a component in which the transducer is mounted. Such systems include ultrasonic imaging systems, ultrasonic flaw detection systems, ultrasonic cleaners, ultrasonic mixers, ultrasonic sensors, ultrasonic welding systems, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A transducer system, comprising:
    a transducer head having an ultrasonic transducer disposed therein and having a first surface configured to be exposed to process pressure when the transducer system is mounted in a flowcell;
    a transducer stem coupled to the transducer head and extending therefrom; and
    a pressure mounting assembly in which at least a portion of the transducer stem is disposed, the pressure mounting assembly having a first pressure balance surface configured to be exposed to process pressure when the transducer system is mounted in a flowcell, the first pressure balance surface being configured to balance forces applied by an atmospheric pressure on the first surface;
    wherein the first surface and the first pressure balance surface face in opposite directions such that process pressure acting on the first pressure balance surface offsets process pressure acting on the first surface.

2. The system of claim 1, wherein the first pressure balance surface is sized such that, when the transducer system is mounted in a flowcell, the surface area of all surfaces of the transducer system facing towards process fluid in the flowcell and exposed to process pressure is equal to the surface area of all surfaces of the transducer system facing away from the process fluid and exposed to process pressure.

3. The system of claim 1, wherein: the pressure mounting assembly includes a piston having a first portion and a second portion, the first portion of the piston having a threaded bore formed therein in which a threaded portion of the transducer stem is received; and the first portion of the piston meets the second portion of the piston at a shoulder that defines the first pressure balance surface.

4. The system of claim 1, wherein: the pressure mounting assembly has a second pressure balance surface configured to be exposed to atmospheric pressure when the transducer system is mounted in a flowcell; and the second pressure balance surface is sized such that, when the transducer system is mounted in a flowcell, the surface area of all surfaces of the transducer system facing towards process fluid in the flowcell and exposed to atmospheric pressure is approximately equal to the surface area of all surfaces of the transducer system facing away from the process fluid and exposed to atmospheric pressure.

5. The system of claim 4, wherein: the pressure mounting assembly includes a piston having a first portion and a second portion, the first portion of the piston having a threaded bore formed therein in which a threaded portion of the transducer stem is received; and an end surface of the piston that faces towards the process fluid defines the second pressure balance surface.

6. The system of claim 5, wherein the second pressure balance surface is exposed to atmospheric pressure through a threaded interface between the transducer stem and the bore formed in the first portion of the piston.

7. The system of claim 1, wherein the pressure mounting assembly comprises: a piston having a first portion and a second portion, the first portion of the piston having a threaded bore formed therein in which a threaded portion of the transducer stem is received; a seal plug having a first portion and a second portion, the second portion of the seal plug having a bore formed therein in which the first portion of the piston is received; and a sleeve having a first portion and a second portion, the first portion of the sleeve having a bore formed therein in which the second portion of the seal plug is received.

8. The system of claim 7, comprising: a first o-ring configured to form a seal between the transducer stem and the first portion of the seal plug; a second o-ring configured to form a seal between the first portion of the piston and the second portion of the seal plug; a third o-ring configured to form a seal between the second portion of the piston and an interior surface of the sleeve; and a fourth o-ring configured to form a seal, when the transducer system is mounted in a flowcell, between the sleeve and the flowcell.

9. The system of claim 7, wherein the first pressure balance surface is exposed to process pressure through a threaded interface between the second portion of the seal plug and the bore formed in the first portion of the sleeve.

10. The system of claim 7, wherein, when the transducer system is mounted in a flowcell, no surface of the piston, the transducer head, or the transducer stem that faces towards process fluid in the flowcell or away from process fluid in the flowcell is in contact with the seal plug, the sleeve, or the flowcell.

11. A transducer system, comprising:
a transducer head having an ultrasonic transducer disposed therein;
a transducer stem extending from the transducer head;
at least one acoustic dampening element disposed on an exterior of the transducer stem such that the at least one acoustic dampening element is disposed between the transducer stem and a flowcell when the transducer system is mounted in a flowcell; and
an annular interruption groove formed in the transducer stem such that the interruption groove defines a longitudinal portion of the transducer stem having a reduced cross-sectional area, wherein the annular interruption groove is configured to limit propagation of ultrasonic waves through the transducer stem.

12. The system of claim 11, wherein the transducer stem includes an annular projection and wherein the transducer system is configured such that, when mounted in a flowcell, no portion of the transducer stem other than the annular projection is in contact with the flowcell.

13. The system of claim 12, wherein the annular projection has a length that is less than about 20 percent of the length of the transducer stem.

14. The system of claim 11, wherein the at least one acoustic dampening element comprises first and second o-rings spaced a distance apart from one another along the length of the transducer stem.

15. The system of claim 11, wherein the interruption groove has a depth that is at least about 50 percent of the thickness of a sidewall of the transducer stem.

16. The system of claim 11, comprising: a nut disposed over the transducer stem and configured to engage a bore of a flowcell to prevent movement of the transducer stem relative to the flowcell in a direction away from process fluid in the flowcell; and a dampening washer disposed between the transducer stem and the nut.

17. A transducer system, comprising:
a transducer head having an ultrasonic transducer disposed therein;
a transducer stem extending from the transducer head;
a piston disposed over the transducer stem, the piston being movable with respect to a flowcell when the transducer system is mounted in the flowcell;
a first set of one or more acoustic dampening elements disposed between the piston and the transducer stem;
a second set of one or more acoustic dampening elements disposed on an exterior of the piston such that the second set of acoustic dampening elements is disposed between the piston and the flowcell when the transducer system is mounted in the flowcell;
a nut disposed over the transducer stem and configured to engage a bore of the flowcell; and
a dampening washer disposed between the piston and the nut.

18. The system of claim 17, wherein the dampening washer is configured to reduce acoustic noise coupling between a surface of the piston that faces away from process fluid when the transducer system is mounted in a flowcell and a surface of the nut that faces towards process fluid when the transducer system is mounted in a flowcell.

19. The system of claim 17, wherein, when the transducer system is mounted in a flowcell, no portion of the transducer head or the transducer stem contacts the dampening washer, the nut, or the flowcell.

20. The system of claim 17, wherein the first set of acoustic dampening elements comprises first and second o-rings spaced a distance apart from one another along the length of the transducer stem; and the second set of acoustic dampening elements comprises first and second o-rings spaced a distance apart from one another along the length of the piston.

* * * * *